United States Patent
Congdon

(10) Patent No.: US 7,504,083 B2
(45) Date of Patent: Mar. 17, 2009

(54) PROCESS OF FORMING A SOL-GEL/METAL HYDRIDE COMPOSITE

(75) Inventor: James W. Congdon, Aiken, SC (US)

(73) Assignee: Savannah River Nuclear Solutions, LLC, Aiken, SC (US)

(*) Notice: Subject to any disclaimer, the term of this patent is extended or adjusted under 35 U.S.C. 154(b) by 644 days.

(21) Appl. No.: 11/340,154

(22) Filed: Jan. 26, 2006

(65) Prior Publication Data

US 2007/0172656 A1    Jul. 26, 2007

(51) Int. Cl.
*C01B 33/20* (2006.01)

(52) U.S. Cl. ....................... 423/326; 502/439

(58) Field of Classification Search ............... 423/313, 423/326, 327.1, 330.1; 502/240, 401, 402, 502/405, 407, 414, 439
See application file for complete search history.

(56) References Cited

U.S. PATENT DOCUMENTS

| | | | |
|---|---|---|---|
| 4,799,360 A | 1/1989 | Retallick et al. |
| 5,064,627 A | 11/1991 | Zwart et al. |
| 5,411,928 A | 5/1995 | Heung et al. |
| 5,443,616 A | 8/1995 | Congdon |
| 5,532,074 A | 7/1996 | Golben |
| 5,688,611 A | 11/1997 | Golben |
| 5,958,098 A | 9/1999 | Heung |
| 5,965,482 A | 10/1999 | Heung et al. |
| 6,478,844 B1 | 11/2002 | Ovshinsky |

*Primary Examiner*—Edward M Johnson
(74) *Attorney, Agent, or Firm*—J. Bennett Mullinax, LLC

(57) ABSTRACT

An external gelation process is described which produces granules of metal hydride particles contained within a sol-gel matrix. The resulting granules are dimensionally stable and are useful for applications such as hydrogen separation and hydrogen purification. An additional coating technique for strengthening the granules is also provided.

19 Claims, 3 Drawing Sheets

US 7,504,083 B2

PROCESS OF FORMING A SOL-GEL/METAL HYDRIDE COMPOSITE

STATEMENT AS TO RIGHTS TO INVENTIONS MADE UNDER FEDERALLY SPONSORED RESEARCH AND DEVELOPMENT

This invention was made with Government support under Contract No. DE-AC0996-SR18500 awarded by the United States Department of Energy. The Government has certain rights in the invention.

FIELD OF THE INVENTION

This invention is directed towards composites of metals and metal alloys that react with hydrogen to form metal hydrides. The metal hydride containing composite has improved performance and handling characteristics which offer improvements in the field of hydrogen storage.

BACKGROUND OF THE INVENTION

Metals and metal alloys that are capable of reacting with hydrogen to form a hydride are known as metal hydrides. Most elemental metals and their associated alloys are capable of reacting with hydrogen to form a hydride. Many of these materials have found application in hydrogen storage, hydrogen recovery from gas mixtures, and energy conversion system. Unfortunately, many of the metal hydrides which exhibit the greatest capacity for storing and releasing hydrogen suffer from disadvantages that have heretofore limited their utility for wide scale use.

One property of metal hydrides is that as the metals and alloys react with hydrogen during repeated cycles of hydrogen absorption and release, the metals and alloys break (decrepitate) into small pieces and particulates on the micron and submicron scale known as "fines." Where such materials are used as membranes or filters for separating hydrogen from other gases, the generation of fines will decrease the efficiency of the filter and/or result in filter failure. Where hydrogen storage materials are used in packed columns or beds, the production of fines causes excessive resistance to gas flow and to blockages.

A further disadvantage to metal hydride materials is a sensitivity to gaseous poisons such as carbon monoxide, various sulfur compounds, and reactive gases including oxygen. Since commercial hydrogen streams often contain small amounts of these impurities, the use of metal hydrides in such applications has been limited.

In Assignee's commonly owned U.S. Pat. No. 5,958,098 which is incorporated herein by reference, a process is provided in which a metal hydride composition is embedded within a silicon oxide which, via a polymerization process, provides a silica matrix having a series of fine pores which contain therein a metal hydride. The silica pores may be of sufficient pore size to exclude common gaseous poisons while retaining fines may be generated within the silica matrix. While the resulting material has tremendously useful properties, the process of generating the sol-gel metal hydride composite does not lend itself to large-scale commercial production.

Accordingly, there remains room for improvements directed more efficient manufacturing techniques for metal hydride composites as well as compositions of metal hydrides having improved dimensional stability.

SUMMARY OF THE INVENTION

It is at least one aspect of one embodiment of the present invention to provide for a process of creating a sol-gel matrix containing therein a hydrogen storage material such as a metal hydride wherein the sol-gel matrix is resistant to the expansion and contraction of the hydrogen storage material in repeated cycles of hydrogen release and absorption.

It is a further aspect of at least one embodiment of the present invention to provide for a sol-gel hydrogen storage composite which is in the form of a free-flowing granular material and which exhibits adequate strength for handling, for compression loading within a column or reactor.

It is a further aspect of at least one embodiment of the present invention to provide for a process of forming a sol-gel hydrogen storage composite using an external gelation process.

These and other aspects of at least one embodiment of the present invention may be provided by a process of forming a sol-gel matrix containing therein a hydrogen storage material comprising the steps of:

providing a supply of particulates of a hydrogen storage material;

blending the hydrogen storage material with a pore former, thereby forming an agglomeration of the hydrogen storage particles and the pore former;

dispersing the agglomeration into a colloidal silicate/solvent suspension;

introducing drops of the suspension into a supply of heated silicon oil;

evaporating the solvent from the drops while in the presence of the heated silicon oil, thereby forming substantially spherical granules of a metal hydride within a silica matrix; and, separating the granules from the silicon oil.

These and other features, aspects, and advantages of the present invention will become better understood with reference to the following description and appended claims.

BRIEF DESCRIPTION OF THE DRAWINGS

A fully enabling disclosure of the present invention, including the best mode thereof to one of ordinary skill in the art, is set forth more particularly in the remainder of the specification, including reference to the accompanying drawings.

DESCRIPTION OF THE PREFERRED EMBODIMENT

Reference will now be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features, and aspects of the present invention are disclosed in the following detailed description. It is to be understood by one of ordinary skill in the art that the present discussion is a description of exemplary embodiments only and is not intended as limiting the broader aspects of the present invention, which broader aspects are embodied in the exemplary constructions.

In describing the various figures herein, the same reference numbers are used throughout to describe the same material, apparatus, or process pathway. To avoid redundancy, detailed descriptions of much of the apparatus once described in relation to a figure is not repeated in the descriptions of subsequent figures, although such apparatus or process is labeled with the same reference numbers.

The present invention is directed to an external gelation process which produces granules containing a hydrogen storage material, such as a metal hydride, within a sol-gel matrix. It has been found that the process provides for dimensionally stable granules containing a hydrogen storage material that is compatible with commercial applications requiring hydrogen separation and hydrogen purification.

Figure 1:
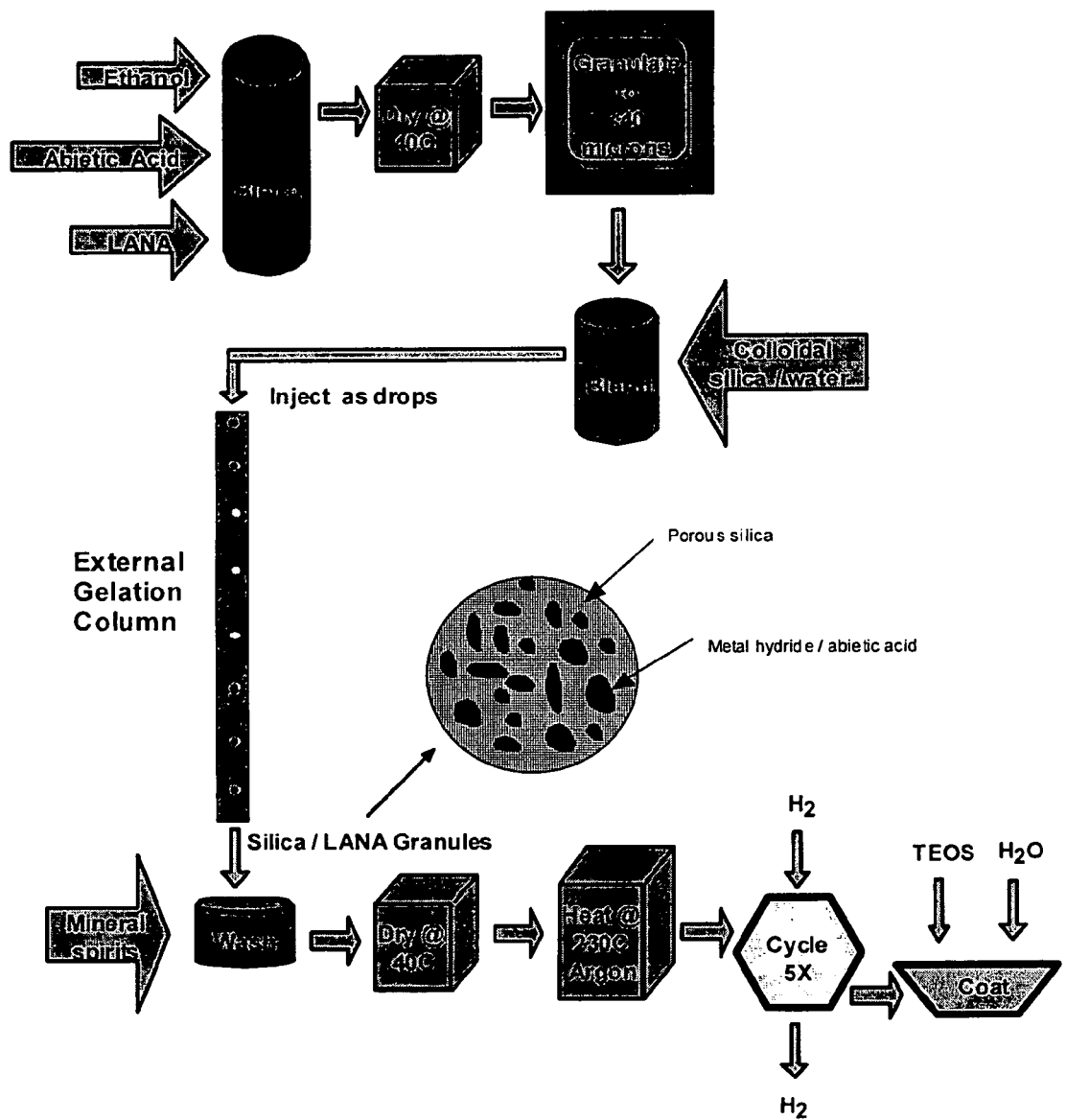
FIG. 1 is schematic view of a process that may be used to form a sol-gel matrix containing a hydrogen storage material using an external gelation process.

As set forth in FIG. 1, a schematic overview is provided of an external gelation process. The process includes taking small agglomerates of a hydrogen storage material and blending them with a pore former such as abietic acid. The blended material is dispersed within a colloidal silica/solvent suspension to form a feed slurry.

Individual drops of the feed slurry are placed into an upper region of a column supporting a volume of heated, medium viscosity silicon oil. As the drops of the feed slurry settle within the column of silicon oil, the solvent slowly evaporates from the drops, forming a sol-gel of spherical granules in which the sol-gel matrix encapsulate a plurality of hydrogen storage particles.

Once formed, the spherical granules are removed from the silicon oil, washed in a solvent such as mineral spirits, and then air dried at 40° C. The granules are then heated in an inert gas such as argon to further remove the remaining water and to drive off any organic materials, including the pore former.

The resulting product comprises spherical composite granules ranging between about 100 to about 2,000 microns in diameter. The silicon matrix is characterized by an open porosity which allows hydrogen and hydrogen isotopes to rapidly permeate through the matrix. The resulting spheres were demonstrated to be able to readily absorb and desorb hydrogen without loss of physical integrity. While microcracking was observed following multiple cycles of hydrogen storage and release, the granules remain intact. It has been found that the granules, following microcracking, may be coated with a thin layer of a polymer sol-gel which improves the strength of the granules and facilitates the handling and use of the granules in compressive load environments such as large columns.

As used herein, the term "metal hydride" is used to describe metals and alloys that are capable of forming metal hydrides, even if they have not yet absorbed hydrogen. Metal hydrides may include any of the conventional hydrogen absorbing metals and metal alloys such as hydrides of metals and complex hydrides. Further, one or more catalysts or dopants such as titanium, zirconium, vanadium, iron, cobalt, nickel, lanthanum, and mixtures thereof may be present. Additional hydrogen storage materials which are believed useful in the present application include the hydrogen storage materials identified in U.S. Pat. No. 5,443,616 of Congdon and which is incorporated herein by reference, and U.S. Pat. No. 5,958,098 to Heung which is incorporated herein by reference.

EXAMPLE 1

Metal Hydride. The metal hydride used in the current example is a commercially available lanthanum-nickel-aluminum alloy ($LANA_{0.75}$). The selected alloy is readily available and has been well characterized in a number of studies. However, it is expected that other metal hydride materials may be substituted with similar results.

Preferably, the metal hydride is in the form of a fine particulate having an average size of less than about 40 microns and more preferably a size of less than about 20 microns and still more preferably having a size of less than about 5 microns. There are a variety of ball milling and particulation processes that may be used to generate the desired particle size of a metal hydride. For the purposes of this study, metal hydride particles formed by the decrepitation of metal hydrides following multiple hydrogen absorption/desorption cycles were used. The decrepitated particles were surface oxidized and screened to select particles of 20 microns or less. The LANA content of the particulates is 40 wt % with the remaining 60 wt % being silica.

The resulting particulates of the metal hydrides were blended with a pore former of abietic acid. For the particulates being used, it was found that a ratio of abietic acid to LANA of about 1:4 provided optimal results.

The abietic acid was dissolved in ethanol and blended with the metal hydride particles. Following blending, the blended mixture is dried and forced through a sieve to produce small agglomerates of the metal hydride/pore former. Abietic acid is a useful pore former in that its melting point is higher than the silicon oil temperature used in the external gelation process. In addition, it has a sufficiently low boiling point of 350° C. such that the pore former may be removed by heat but without approaching temperatures that would result in a sintering of the silica matrix and thereby adversely affecting the porosity of the matrix. Further, abietic acid is a relatively simple organic compound that does not generate any decomposition products that would inactivate the metal hydrides. In addition, the solubility of abietic acid in alcohol facilitated the coating of the metal hydride particles while the insolubility of abietic acid in water facilitates the use of an aqueous feed slurry as described below.

The resulting agglomeration of the pore former and metal hydride was this dispersed into a colloidal silica matrix material. The silica used was a 14 nanometer fumed silica in which a 40 wt % of silica to solvent was used. While a other solvents such as ethanol were evaluated, a water based suspension was found to be preferred for the materials used and procedures adopted herein. The slurry resulting from blending the metal hydride, pore former, and colloidal silicate was introduced in a drop wise fashion into a supply of heated silicon oil. The silicon oil is continually being discharged from the supply of heated silicon oil. The removed oil is collected in an oil bath at the base of the column of heated oil, optionally warmed to facilitate pumping to facilitate pumping to the top of the column and then adjusting the temperature of the oil to about 55° C. prior to injection into the top of the column.

The suspension is added drop wise to a first supply (returned oil) of a heated silicon oil at a temperature of about 55° C. The suspension within the heated silicon oil is then, in turn, introduced into a second supply of heated silicon oil, the second supply of silicon oil being at a temperature of about 65° C. In accordance with this invention, it has been found that by adding a cooler supply of the suspension/oil into a warmer supply of oil, the resulting drops will more readily sink into the second supply of silicon oil based upon differences in temperature/density. If the aqueous suspension is added directly into the column of heated silicon oil, the resulting drops tend to float and congregate on the upper surface of the heated oil.

In order to achieve adequate gelation of the sol-gel composite, it is necessary to provide an adequate residence time for the suspension drops within the heated silicon oil. Accordingly, a 27 foot column was used as indicated in reference to FIG. 1. The column length was sufficient to provide adequate time for gelation to occur before the resulting particles reach the bottom of the column.

An oil viscosity of between about 50 to about 5,000 centistokes. were evaluated. For the condition and parameters described herein, a 3,000 centistoke silicon oil was adopted. However, one having ordinary skill in the art will realize that variations may be made in oil temperature, suspension drop size, oil viscosity, and oil height which would affect the overall process. Such parameters may be adjusted as needed by routine experimentation to achieve the process variables which work best for a given metal hydride and available equipment resources.

It is further recognized that the variables described above may be easily monitored, manipulated, and reproduced such that a high degree of uniformity in an end product may be obtained. Further, the external gelation process is one that may be easily scaled up in size to allow larger quantities of product to be formed.

In order to maintain reproducible results, a micro-peristaltic pump was used to feed the suspension through a small orifice and into a first supply of silicon oil. It is possible to vary the orifice, the velocity of incoming oil, and the feed pump speed so as to achieve the desired frequency of drop formation.

In general, small drops on the order of about 500 to about 1000 microns are preferred since such drops tended to settle more slowly and thus minimize the height requirements of the column. In accordance with this invention, it was found that by feeding drops from the peristaltic pump directly into an incoming stream of silicon oil, smaller drops could be produced in that the oil tended to "pull" the droplets from the feed tube orifice. Using a peristaltic pump, a drip rate of approximately 100 drops/min was possible using a 0.89 mm inner diameter flexible tubing to form the drops. The micro-peristaltic pump achieved these conditions using a setting of about 70 ml/min. Under such conditions, fairly uniform size granules ranging from about 500 to about 900 microns could be produced.

It was also determined that by decreasing the diameter of the oil feed tube to about a ¼" inner diameter, the resulting oil velocity increased sufficiently that the feed slurry was broken into a nearly continuous stream of small droplets each droplet being less than 100 microns. Using this protocol, it was found possible to produce a wide size range of granules since many of the small drops coalesced into a larger, single drop while still in the liquid state.

As seen in reference to FIG. 1, a vertical column is used to contain the heated silicon oil. The peristaltic pump feed system described above was placed such that the injected drops of the metal hydride/colloidal silica suspension were injected into a center tube of the column. The column was designed such that the top section of the column consisted of two concentric tubes (not illustrated) in which there was an overflow port near the top of the outer tube along with an adjacent vent port. By introducing the suspension into the inner tube, the droplets would not be discharged through the overflow port.

As further seen in reference to FIG. 1, a recirculation loop for the silicon oil collects oil from the bottom of the column for reuse and reentry into the upper portion of the column. Using conventional heating tape and water baths, it is possible to maintain the silicon oil in the column at any desired temperature. To simplify the recirculation of oil withdrawn from the bottom of the column, it was found useful to warm the oil to 82° C. to lower its viscosity. Prior to the removed oil being reintroduced into the column and via the slurry feed tube, a water bath was used to adjust the temperature of the incoming oil to at least about 10° C. less than the temperature of the silicon oil in the main column. For the equipment utilized herein, it has been found that the injection silicon oil into which the feed slurry was placed was at a temperature of about 55° C. while the temperature of the silicon oil residing in the main column was at a temperature of about 65° C. However, one having ordinary skill in the art could adjust the temperature ranges, oil viscosity, column height, slurry droplet size, and slurry droplet introduction rate so as to achieve equivalent results using variations of temperature, feed rate, and residence time within a silicon oil.

Under the conditions described above and as seen in reference to FIG. 1, it was found that the residence time for a range of slurry droplet sizes was adequate to bring about the external gelation. If a temperature of the silicon oil was too great, i.e., above 95° C., it was found that the rapid evaporation of the solvent from the drops would cause drops to burst. At temperatures above 80° C., it was found that the speed of evaporation would cause the formation of a shell around the still liquid interior of the droplet. The pressure differential which resulted caused a number of spherical granules to be formed having a "blowout" hole in a side of the granule shell.

In accordance with the present invention, it was found that an optimal oil temperature of about 65° C. for the column produced desirable evaporation rates for the granule size ranges generated by the slurry feed system. As is readily appreciated by those having ordinary skill in the art, heating coils and heating jackets may be used to maintain the desired temperature of the oil within the column.

The external gelation products were collected from the bottom of the column using a 200-mesh sieve and allowed to age overnight in warm silicon oil. Granules were cleansed by washing in mineral spirits followed by an initial drying at 40° C. provided adequate cleaning. In addition, a second heat treatment at about 240° C. for 60 minutes in the presence of an inert argon gas was used to remove any remaining water along with organic solvents and other organics such as the pore former.

Figure 2A:
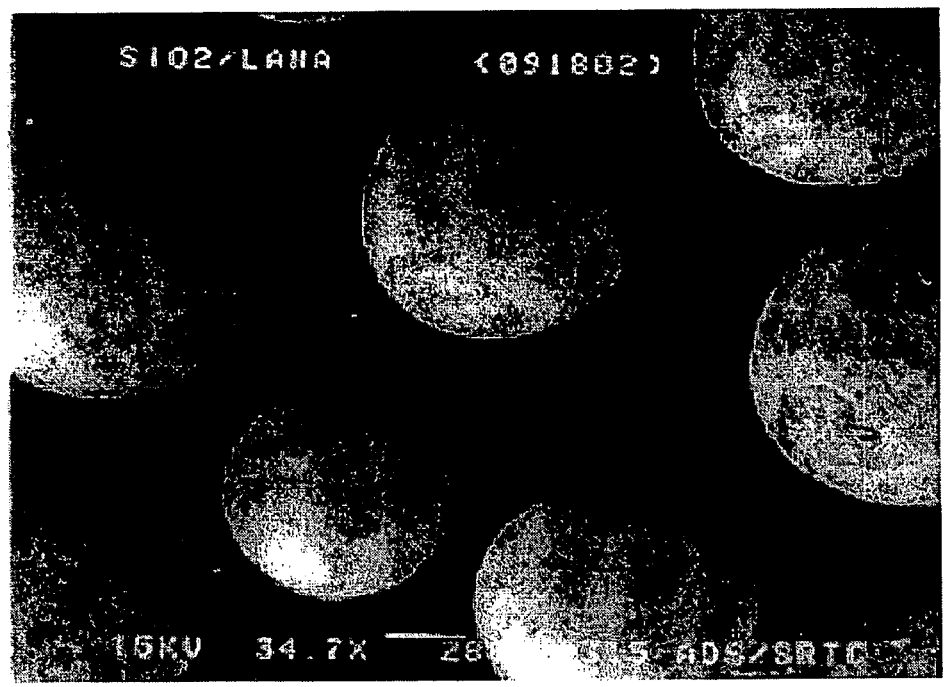
FIGS. 2A and 2B are electron micrographs showing the spherical granules formed from an external gelation process and a cross section through one of the granules.
Figure 2B:
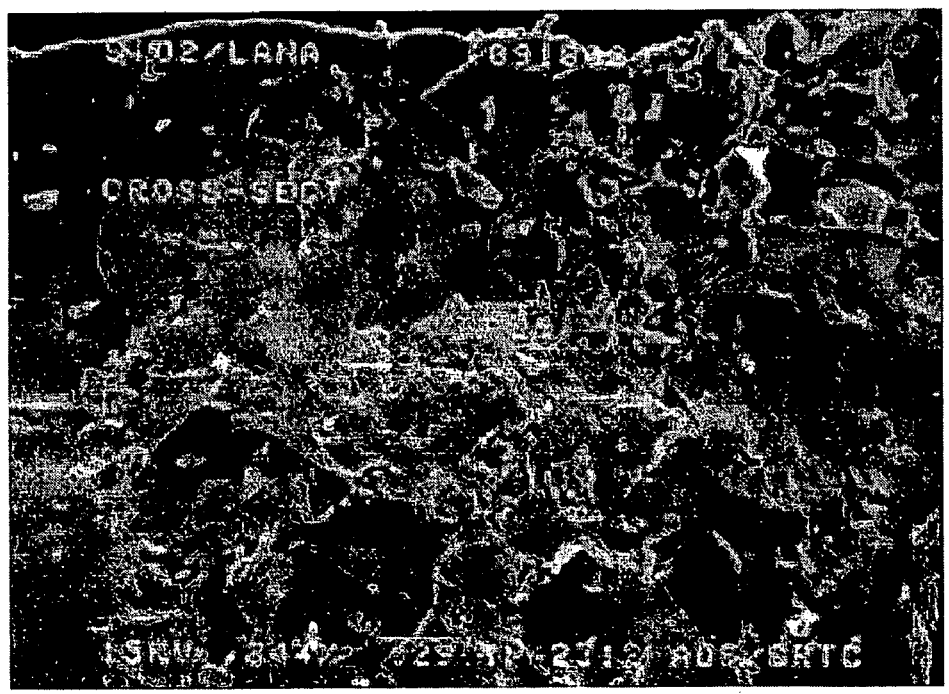

Following removal of the pore former, the granules were evaluated for their ability to absorb and release hydrogen. Using conventional hydrogen absorption/desorption procedures, the granules were cycled in hydrogen five times. The test results, not separately set forth, indicate that the external gelation process did not impair the hydrogen storage capacity of the metal hydride particles. It was noted that the hydrogen cycling did result in the formation of fine fracture lines which appeared on the surface of the granules as seen in reference to FIG. 2A. While the resulting granule spheres remained intact, the microspheres did exhibit lower physical strength compared to microspheres examined prior to hydrogen cycling. Evaluations of the granules indicated that, while the addition of a pore former was effective at preventing the physical disintegration of granules after exposure to hydrogen, the granules were still weakened by microcracking believed attributable to the expansion of the metal hydride during hydrogen absorption.

To strengthen the resulting granules, a coating technique was developed in which a thin polymer of sol-gel was applied to the granules following cycling with hydrogen. The coating technique involved applying a layer of a tetraethoxysilane (TEOS) which was poured over a thin layer of granules supported on a 325-mesh sieve. The TEOS was poured over the granules in three cycles in which the supporting sieve was vibrated to redistribute the granules between each pass. The resulting TEOS-saturated granules were heated in a high humidity (saturated) environment such that the TEOS coated granules were exposed to water vapor. The resulting reaction between the water and the TEOS formed a polymer sol-gel coating. The sol-gel coated granules were then dried at a low temperature.

Figure 3:
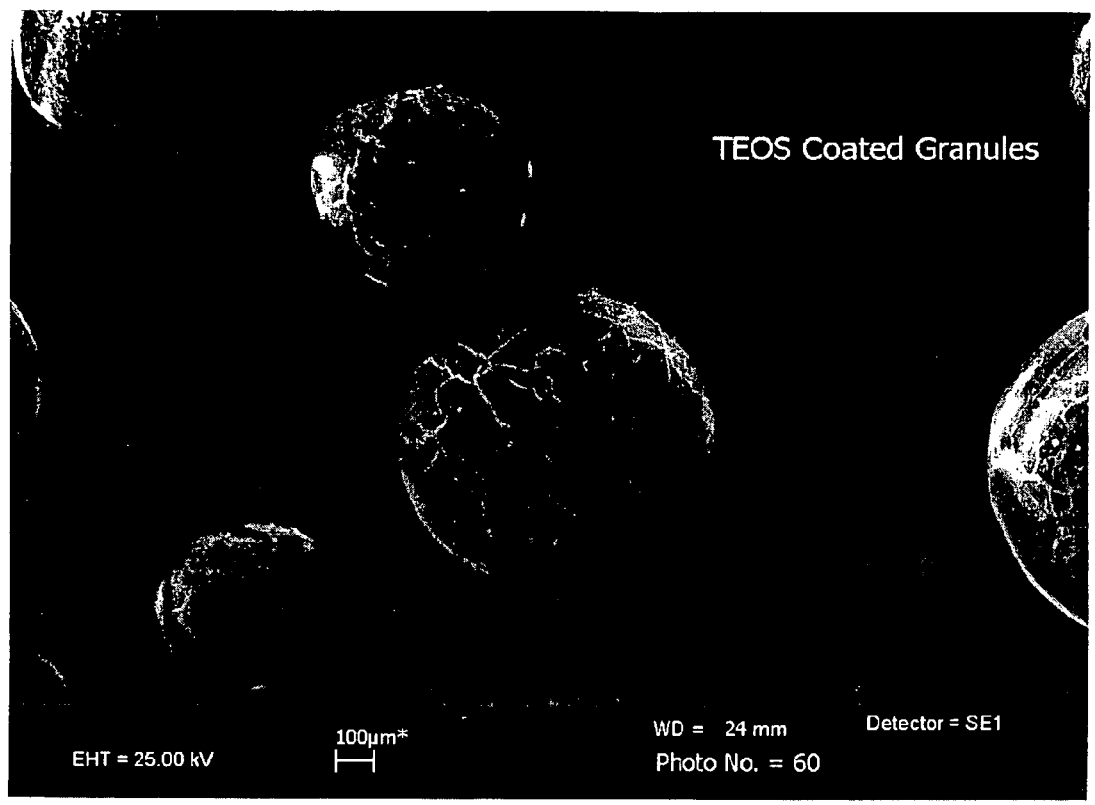
FIG. 3 is an electron micrograph of a granule following five cycles of hydrogen absorption and release and subsequently coated with tetraethoxysilane (TEOS).

As set forth in FIG. 3, an electronmicrograph of a TEOS coated granule is provided. It was observed that the amount of force required to crush the granules following coating was greater than the crush force of uncoated granules. Further, following an additional five cycles of hydrogen absorption/desorption, the coated granules did not appear to lose strength.

It also has been observed that the sol-gel coating may provide some additional barrier properties to gaseous poisons by preventing the passage of larger gaseous molecules while facilitating the uninhibited flow of smaller hydrogen and hydrogen isotopes. It is believed that by further modification of the sol-gel coating and coating process, it may be possible to provide a strengthening sol-gel coating which also serves as a barrier to gaseous poisons such that the resulting coated granules may be used in diverse feed streams for hydrogen separation and storage.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention which is set forth in the following claims. In addition, it should be understood that aspects of the various embodiments may be interchanged, both in whole, or in part. Therefore, the spirit and scope of the appended claims should not be limited to the description of the preferred versions contained therein.

That which is claimed:

1. A process of forming a sol-gel matrix containing therein a hydrogen storage material comprising the steps of:
   providing a supply of particulates of a hydrogen storage material;
   blending said hydrogen storage material with a pore former, thereby forming an agglomeration of said hydrogen storage particles and said pore former;
   dispersing said agglomeration into a colloidal silicate/solvent suspension;
   introducing drops of said suspension into a supply of heated silicon oil;
   evaporating said solvent from said drops while in the presence of said heated silicon oil, thereby forming substantially spherical granules of a metal hydride within a silica matrix; and,
   separating said granules from said silicon oil.

2. The process according to claim 1 wherein said hydrogen storage material is selected from the group consisting of metal hydrides, complex alloys of B, Ti, La, Ni, Zr, Co, Al, and combinations thereof.

3. The process according to claim 1 wherein said supply of particulates of a hydrogen storage material have an average particulate size of about 20 microns or less.

4. The process according to claim 1 wherein said pore former is abietic acid.

5. The process according to claim 4 wherein said abietic acid is present at a ratio of about 1:4 per wt % relative to said hydrogen storage material.

6. The process according to claim 1 wherein said solvent within said colloidal silicate/solvent suspension is selected from the group consisting of water and ethanol.

7. The process according to claim 1 wherein said heated silicon oil has a viscosity of between about 500 centistokes to about 3,000 centistokes.

8. The process according to claim 1 wherein said silicate used in said colloidal suspension is a fumed silica.

9. The process according to claim 8 wherein said fumed silica has an average particle size of about 14 nanometers.

10. The process according to claim 1 wherein said colloidal silica/solvent suspension further comprises about a 40 wt % of silica.

11. The process according to claim 1 wherein said hydrogen storage material is a lanthamum-nickle-aluminum alloy.

12. The process according to claim 1 wherein said heated silicon oil is at a temperature of between about 60° C. to about 95° C.

13. The process according to claim 1 wherein said step of introducing drop of said suspension further comprises placing said drops in a first supply of heated silicon oil and subsequently introducing said drops in said first supply of heated silicon oil into a second supply of heated silicon oil, said second supply of heated silicon oil being warmer than said first supply of silicon oil.

14. The process according to claim 1 wherein following said separating step, said granules have applied thereto a protective coating.

15. The process according to claim 14 wherein said protective coating is tetraethoxysilane (TEOS).

16. The process according to claim 1 comprising the additional step of heating said granules to a temperature of between about 200° C. to about 300° C. in the presence of an inert gas thereby evaporating said pore former.

17. A porous sol-gel matrix containing therein a hydrogen storage material made according to the process of claim 1.

18. A process of strengthening a sol-gel matrix containing therein a hydrogen storage material comprising the steps of:
   providing a particulate comprising a sol-gel matrix containing therein a hydrogen storage material;
   coating an exterior of said sol-gel particulate with tetraethoxysilane; and,
   reacting said tetraethoxysilane with water, thereby providing an exterior protective layer of tetraethoxysilane to said sol-gel.

19. The process according to claim 18 wherein said sol-gel matrix further defines a plurality of cracks created by the absorption and desorption of hydrogen by the hydrogen storage material therein.

* * * * *